April 26, 1938.     M. WAIDE     2,115,153
OPTICAL SYSTEM
Original Filed March 1, 1930
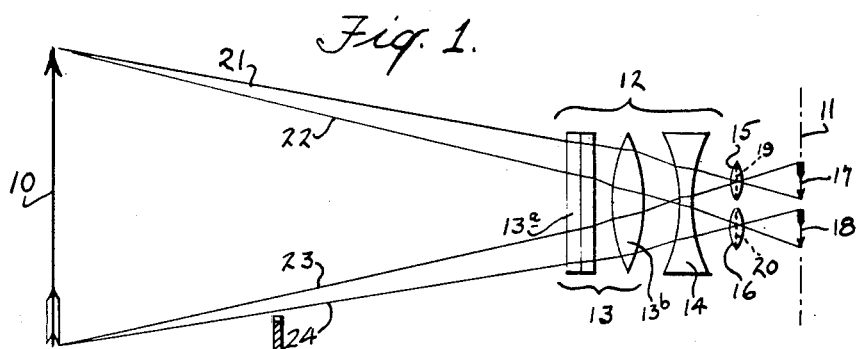
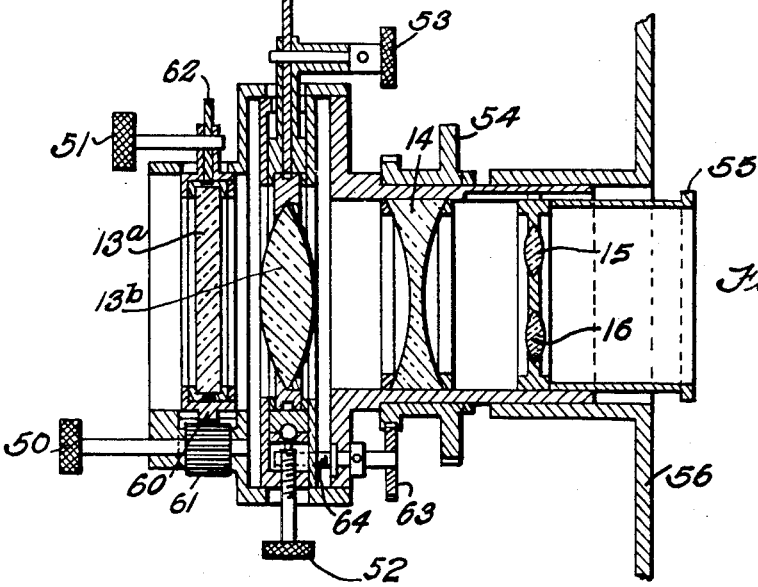
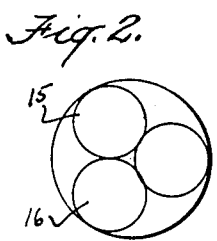
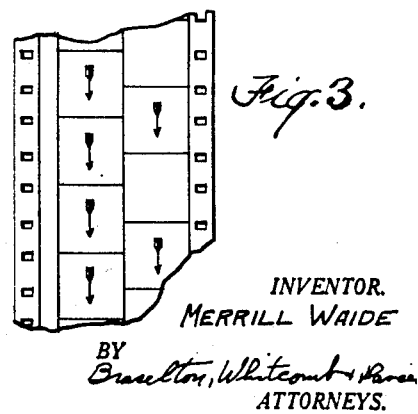
INVENTOR.
MERRILL WAIDE
BY
ATTORNEYS.

Patented Apr. 26, 1938

2,115,153

UNITED STATES PATENT OFFICE 2,115,153

OPTICAL SYSTEM

Merrill Waide, New York, N. Y., assignor, by mesne assignments, to Opticolor, Incorporated, New York, N. Y., a corporation of New York Original application March 1, 1930, Serial No. 432,325. Divided and this application August 20, 1934, Serial No. 740,588

4 Claims. (Cl. 88—1)

This invention relates to an optical system which may be used in photography to produce a plurality of images of a single object upon a sensitized screen and in projection to produce a single composite image upon a screen from a plurality of photograhic records.

Heretofore, in photographing an object in colors or to produce quasi stereoscopic effects there has been considerable difficulty in forming a plurality of images upon a sensitized screen and subsequently superimposing these images to form a single composite projection unless in the latter case the use of a multiple layer of dyed film with its necessary sacrifice of the quality of the image was acceptable. If in photography the rays from a single objective are split by refraction or reflection to form the three images necessary for natural color photography the effective aperture is divided thus causing a serious diminution of illumination. This is especially true at a short focus and in speed work, such as motion pictures, and especially where color filters are used. If the plurality of images formed are the result of adjacent objectives at different points of view then when such images are projected upon a screen at yet another distance serious faults, such as those associated with parallax, are found in the resultant picture.

It is one of the principal objects of this invention to provide an optical system to make use of substantially all of the light passing through a given effective aperture to form each of a plurality of images.

Another object of the invention is to simultaneously cause a plurality of images substantially alike geometrically to be formed upon a sensitized screen from a single object field and to permit the simultaneous superpositioning of such images to form a single composite image when the system is used in projection.

Another object of the invention is to provide an optical system which may be used in photography to form a plurality of images and which will permit photographing scenes at practically any distance without change of the position of the respective images on the film.

Another object of the invention is to provide an optical system which may be used in projection and which will permit operation at practically any screen distance with the images substantially superimposed upon the screen.

A further object of the invention is to provide an optical system having a relatively great depth of focus by reducing the parallax in photographing when using the major portion of the effective aperture of each of several adjacent objectives.

A still further object of the invention is to provide an optical system by which some quasi stereoscopic effect may be obtained.

Other objects of the invention are to provide an optical system in which sharpness of line may be obtained when optically superimposing a plurality of photographic records upon a screen, to obtain a cancellation of the visibility of the emulsion grain by the superimposing of a plurality of photographs, to obtain natural color images correct throughout the object field by use of the major portion of the effective aperture in an additive process, to permit greater range of values by the ability to use softer light, and to permit either visual or scale focusing by a well-known movement or device.

This application is a division of my prior filed application 432,325, filed March 1, 1930, which latter application has matured into Patent 1,970,678, August 21, 1934.

In the accompanying drawings which are optical diagrams showing the nature and relation of parts of a few of the possible embodiments of my invention the same parts are designated by like reference characters:

Fig. 1 is a diagram showing the principal rays of light passing through an optical system arranged in accordance with one embodiment of my invention;

Fig. 2 is a front view of the coplanar lenses of Fig. 1;

Fig. 3 is a front view of a moving picture film showing the three photographic records thereon; and Fig. 4 is a view showing conventional mechanism for adjusting the elements of the optical system.

While lenses of certain configuration are shown in the various diagrams and are illustrated as single lenses it is to be understood that any one of the lenses shown may be composed of several parts in order to correct any or all of the well-known errors found in lenses such as coma, aberration, astigmatism, etc., and no attempt has been made in these figures to illustrate these corrections which are well-known in the art.

The use of the invention will first be explained in connection with photography to make image records of an object upon a sensitized screen. Referring then more specifically to Fig. 1, an arrow 10 is illustrated as the object to be photographed. A sensitized film 11 is adapted to receive the image or images of the arrow 10 in order to photographically record them thereupon. A combination 12 of lenses is placed between the object 10 and the sensitized film 11 and comprises a convergent lens combination 13, nearest to the object 10, and a divergent lens 14 between the convergent lens and the film 11. The lens combination 12 is spaced from the object 10 so that the object lies in the front focal plane thereof.

I may prefer to construct the lens combination 13 of two cylindrical lenses 13a and 13b active in mutually perpendicular planes and together having the same effect as a spherical convergent lens combination as far as convergency is concerned. However, it is apparent that whereas a spherical lens will tend to converge to a point, the lens combination 13 will tend to converge to a caustic with dimensions alterable in accordance with the setting of the individual cylindrical lenses. For these adjustments the two lenses are preferably provided with independently adjusting mechanism of any suitable nature so that they may be shifted laterally and also rotated to give certain desired effects.

A plurality of similar convergent lenses 15 and 16 are arranged between the lens combination 12 and the film 11 and these lenses are placed substantially in the same plane and their function is to form a plurality of independent images 17 and 18 of the object 10 upon the sensitized film 11. To do this they are positioned from the film 11 a distance equal to their focal lengths respectively for the particular color of light refracted by each. The two lenses 15 and 16 are shown for convenience of illustration but it is to be understood that more lenses may be used to produce more images although to give the natural color effect three of these lenses have been found to be sufficient. These lenses may be arranged with their optical axes parallel to and surrounding the optical axis of lens combination 12 as indicated in Fig. 3.

The lens 15 may be provided with a color screen 19 and the lens 16 may be provided with another color screen 20 of a different color so that the images 17 and 18 will be colored corresponding to the color screens 19 and 20 acting with the lenses 15 and 16. Where three lenses are used the primary colors red, blue-violet, and green may be used to form images of red, blue-violet, and green and these color screens may be positioned in accordance with well-known practice.

With the assembly of elements just described above all rays of light from any single point on the object 10 are brought into parallel relation by the lens combination 12 and these rays passing through the lenses 15 and 16 build up the two separate images 17 and 18 on the sensitive film 11 forming separate images thereon substantially geometrically similar to the object 10. It is understood that only principal rays are shown for the sake of clarity but they indicate the position of images sufficiently for illustration. Thus the rays 21 and 22, indicated as emanating from the head of the arrow 10 and striking the lens 13 at different portions on the surface thereof, become parallel after passing through the two lenses 13 and 14 and strike the two lenses 15 and 16, the ray 21 being directed by the lens 15 to form the point of the arrowhead of the image 17 and the ray 22 being directed by the lens 16 to form the point of the arrow-head of the image 18. In like manner rays 23 and 24 from the feather of the arrow 10 strike the lens 13 at different points on the surface thereof and after passing through the lenses 13 and 14 are directed parallelly to each other so that they intercept the lenses 15 and 16 and are directed respectively by these lenses to form the tip of the feather on the images 17 and 18 respectively. It will be seen that if the lenses 15 and 16 have color screens 19 and 20 of different colors the corresponding images 17 and 18 will be colored accordingly. If the arrow 10 has for instance, a red head and a blue feather and the color screens 19 and 20 are red and blue respectively, the red head will appear in the image 17 while the blue feather will appear in the image 18. When positives of these two images are superimposed by reversing this system in a manner hereinafter described it will be evident that the arrow will appear in its proper colors in the projected image.

Although the rays between the lens combination 12 and the coplanar lenses 15 and 16 are parallel it is preferable that the lens combination be spaced from the coplanar lenses as little as practicable so as to avoid loss of light used in forming the images by its falling without the system.

In using this optical system for projection a light source is placed beyond the positive photographic record of images 17 and 18 which are formed on a transparent screen and exactly the reverse of what has already been described takes place. From corresponding points on the records of the two images 17 and 18 the rays strike the lenses 15 and 16 and are brought into parallel relation with each other and after passing through the lens combination 12 converge to a focus on a screen positioned at the focal plane of this lens combination thus forming the image 10 of the arrow.

When the system is used in a camera the coplanar lenses 15 and 16 are positioned with the film in the focal plane thereof and the lens combination 12 is then adjusted by moving the lenses 13 and 14 toward or away from each other. This changes the focal length of the lens combination 12 so that the object 10 may be brought into the front focal plane thereof. When this is done sharp clear images 17 and 18 of the object 10 will be produced on the film 11 and the respective images are also mutually spaced in position on the film at a constant distance from each other regardless of the distance of the object. In projection the combination lens 12 is set so that its focal point is on the screen upon which the object 10 is to be projected and the coplanar lenses are then moved toward or away from the film until the film is in the back focal plane of the lenses at which time the composite projected image of the object 10 will be properly defined and correctly reproduced.

Attention is drawn to the great latitude in adjustment and superimposing provided by the adjustable cylindrical lenses. Focusing of one of these cylindrical lenses independently causes a relative movement of the plurality of images in one direction while a focusing of the other causes a relative movement in a perpendicular direction. Rotation of each cylindrical lens gives yet another adjustment of the relative spacing of the images. Thus independent adjustment for two directions of the image plane is attained and yet there will be no substantial effect upon distortion or definition of the image.

While the lens 13 in Fig. 1 has been shown as comprising cylindrical lenses, it will be understood that other lens combinations may be used.

In Fig. 1 the lens combination 12 is formed of a plurality of lenses for the purpose of changing the focal length of the combination so that objects at different distances from the camera may be photographed or in projection the projecting device may be fixed at different distances from the screen. However, if the distance of the object or screen from the apparatus is fixed a single convergent lens having a focal length equal to that of the lens combinations may be used, but in that case, of course, there would be no adjustment of the lens, the whole apparatus having to be positioned at the proper distance from the object or screen.

Fig. 1 and the lenses 15 and 16 have been described as substantially coplanar or in other words being substantially in the same plane. While this is preferable it may be desirable under certain conditions, as where different colors require different focal lengths, to position these lenses slightly out of the same plane and the invention contemplates such a positioning of the lenses.

In connection with Fig. 1 the positioning of the lenses has been described so as to parallelize certain light rays lying between the lens combination 12 and the coplanar lenses. It will be evident, however, that an angularity of these rays may be compensated for by an adjustment laterally in the relative position of the lenses and a corresponding focusing for definition so that I do not wish to be limited to a construction in which these rays are parallel although I deem such a construction preferable for uniform construction and accurate scaling of the focusing device. The lens combination 12 of Fig. 1 may be reversed, if desired, so that the divergent lens is towards the arrow and the convergent lens is next to the coplanar lenses. The same result may be obtained in this manner and the invention is therefore not to be limited to the arrangement shown in the figure.

It will be evident from the above that I have provided a system which may be used in either photography or projection and which makes use of substantially all of the light falling upon the system from a given object field to form a plurality of images in photography, which images may be superimposed in projection to form a composite image. The formation of a plurality of images or the superimposing of these images is done optically with a minimum loss of light so that considerably less light is needed for either photography or projection. It will also be noted that the lens combination of the invention permits focusing and that in photography the images are automatically positioned when they are in focus so that photographs of distant or near objects may be successively projected without change of focus in projection after the projector has been focused on a given screen.

Any of the well-known means may be used for moving the lenses with respect to each other and I have shown in Fig. 4 conventional mechanism for manipulating these various lenses. In this figure thumb screw 50 is provided for shifting lens 13a laterally by a rack and pinion mechanism 60, 61; thumb screw 51 is provided for imparting a limited rotational movement to the lens 13a through connected pinion mechanism 62; thumb screw 52 is adapted for laterally shifting the lens 13b; thumb screw 53 causes limited rotation of the lens 13b by means of pinion 63 and attached screw 64; geared ring 54 causes an axial shifting of lens 13b; and lenses 15 and 16 are positioned manually through the supporting member 55. 56 is the instrument casing to which the optical system is applied.

It is obvious that variations may be made in the structure shown in the drawing without departing from the spirit of the invention and I do not, therefore, desire to limit myself to what has been shown and described except as such limitations occur in the appended claims.

What I claim is:

1. In apparatus for color photography on film and projection on screens, a main lens unit designed to receive light from a single or multiple object and project multiple or single images in color in accordance with direction of light transmitted, which comprises a light converging lens sub-unit having two independently mounted cylindrical lens elements active in mutually perpendicular planes, a light diverging lens element, a plurality of spaced coplanar light converging lens elements having their optical axes substantially parallel to and surrounding the optical axis of the unit, a color screen integral with each of said coplanar lens elements, the colors of each screen differing from the others, mounts for holding each of said cylindrical lens elements, said diverging lens element and said group of coplanar lens elements, and means for adjusting the position of each of said mounts with relation to the others so as to focus the cylindrical lens sub-unit and diverging lens element on the object or screen and to focus the coplanar lens elements on the film, the light rays between said sub-unit and coplanar lens being rendered parallel, whereby, as a camera, plural images in diverse color are formed on the film, and as a projector a single image in colors is formed on the screen.

2. In apparatus for color photography on film and projection on screens, a main lens unit designed to receive light from a single or multiple object and project multiple or single images in color in accordance with direction of light transmitted, which comprises a light converging lens sub-unit having two independently mounted cylindrical lens elements active in mutually perpendicular planes, a light diverging lens element, a plurality of spaced coplanar light converging lens elements having their optical axes substantially parallel to and surrounding the optical axis of the unit, a color screen integral with each of said coplanar lens elements, the colors of each screen differing from the others, mounts for holding each of said cylindrical lens elements, said diverging lens element and said group of coplanar lens elements, and means for adjusting the position of each of said mounts with relation to the others so as to focus the cylindrical lens sub-unit and diverging lens element on the object or screen, the light rays between said sub-unit and coplanar lens being rendered parallel, and to focus the coplanar lens elements on the film, including devices to shift each cylindrical lens element mount laterally and rotationally, to vary the axial spacing of said cylindrical lens element mounts, and to permit axial adjustment of the coplanar lens element mount whereby, as a camera, plural images in diverse color are formed on the film, and as a projector a single image in colors is formed on the screen.

3. In apparatus for color photography on film and projection on screens, a main lens unit designed to receive light from a single or multiple object and project multiple or single images in color in accordance with direction of light transmitted, which comprises a light converging lens sub-unit having two independently mounted cylindrical lens elements active in mutually perpendicular planes, a light diverging lens element, a plurality of spaced coplanar light converging lens elements having their optical axes substantially parallel to and surrounding the optical axis of the unit, a color screen integral with each of said coplanar lens elements, the colors of each screen differing from the others, mounts for holding each of said cylindrical lens elements, said diverging lens element and said group of coplanar lens elements, and means for adjusting the position of each of said mounts with relation to the others so as to focus the cylindrical lens sub-unit and diverging lens element on the object or screen, the light rays between said sub-unit and coplanar lens being rendered parallel, and to focus the coplanar lens elements on the film, including devices to shift each cylindrical lens element mount laterally and rotationally, to vary the axial spacing of said cylindrical lens element mounts, to permit axial adjustment of the coplanar lens element mount, and to vary the axial displacement between the light diverging lens element and one of said cylindrical lens elements whereby, as a camera, plural images in diverse color are formed on the film, and as a projector a single image in colors is formed on the screen.

4. In apparatus for color photography on film and color projection on screens, a main lens unit designed to receive light from a single or multiple object and project multiple or single images in color in accordance with the direction of light transmitted, which comprises two cylindrical lens elements, a negative divergent lens element effective to render parallel the light rays received from the cylindrical lens elements, a plural positive convergent lens element and color screens for the lenses of the plural positive lens element, mounts for each of said lens elements for holding said elements along the unit axis in the order of cylindrical lens elements, negative lens element and plural positive lens element, and for holding the lenses of the plural positive lens element in a common plane approximately perpendicular to the unit axis and with their axes equally displaced and parallel to the unit axis, and means for varying the axial distance between said elements and for changing the angular relationship of said cylindrical lens elements, whereby plural images in color may be formed on a film and a single image in color on a screen.

MERRILL WAIDE.